United States Patent [19]

Satomi et al.

[11] Patent Number: 5,693,989
[45] Date of Patent: Dec. 2, 1997

[54] LINEAR PULSE MOTOR

[75] Inventors: Hirobumi Satomi; Takao Iwasa, both of Kashiwa, Japan

[73] Assignee: Oriental Motor Co., Ltd., Tokyo, Japan

[21] Appl. No.: 772,280

[22] Filed: Dec. 20, 1996

Related U.S. Application Data

[63] Continuation of Ser. No. 309,456, Sep. 22, 1994, Pat. No. 5,629,572.

[30] Foreign Application Priority Data

Sep. 24, 1993 [JP] Japan ............................. 5-238362

[51] Int. Cl.$^6$ ................................................. H02K 41/00
[52] U.S. Cl. ........................... 310/12; 310/49 R; 318/115
[58] Field of Search .................................. 310/12, 13, 14, 310/49 R; 318/115, 135

[56] References Cited

U.S. PATENT DOCUMENTS

| | | | |
|---|---|---|---|
| 3,370,191 | 2/1968 | Koch | 310/168 |
| 4,810,914 | 3/1989 | Karidis et al. | 310/12 |
| 5,093,596 | 3/1992 | Hammer | 310/191 |
| 5,418,413 | 5/1995 | Sutumi | 310/12 |

FOREIGN PATENT DOCUMENTS

| | | |
|---|---|---|
| 0 291 638 | 11/1988 | European Pat. Off. . |
| 0 319 096 | 6/1989 | European Pat. Off. . |
| 0 482 321 | 4/1992 | European Pat. Off. . |
| 5-19282 | 3/1993 | Japan . |

*Primary Examiner*—Steven L. Stephan
*Assistant Examiner*—Judson H. Jones
*Attorney, Agent, or Firm*—Jacobson, Price, Holman & Stern, PLLC

[57] ABSTRACT

A linear pulse motor includes a stator core manufactured easily and windings for phases disposed in the circumferential direction of the stator core and the length thereof is not lengthened in the shaft direction even when a multi-phase linear pulse motor is configured. The linear pulse motor includes a stator 1 having teeth 17 formed on an inner peripheral surface thereof in the shaft direction and a plurality of salient poles 11, 12, 13, . . . disposed at an equal pitch angle and a mover disposed movably in the shaft direction. A stator core 10 is formed by laminating stator iron plates 30 with the stator iron plates being rotated sequentially by a predetermined angle. When k is an integer larger than or equal to 1 and m is the number of phase, the stator iron plate includes k·m salient poles P1, P2, P3, . . . . One salient pole having a smaller inner radius at the tip thereof and (m−1) salient poles having a larger inner radius at the tip thereof opposite to the mover as viewed from the mover are disposed side by side in order of the description to form one set of salient poles and the stator core is constituted to have k sets of salient poles. The predetermined angle for the lamination and rotation is (360/k·m) degrees.

1 Claim, 6 Drawing Sheets

A-PHASE  B-PHASE  C-PHASE

LINEAR PULSE MOTOR

This is a Continuation of application Ser. No. 08/309,456 filed Sep. 22, 1994 now U.S. Pat. No. 5,629,572

FIELD OF THE INVENTION AND RELATED ART STATEMENT

The present invention relates to a VR (variable reluctance) type linear pulse motor.

As a conventional linear pulse motor of this type, a VR type cylindrical linear pulse motor is disclosed in Japanese Patent Publication No. 5-19282 (No. 19282/1993) (entitled "Linear Actuator"). The linear pulse motor according to the patent publication includes a stator to which windings are wound and an armature supported to the stator movably in the shaft direction thereof. The stator includes segments (iron plates) having a plurality of magnetic poles and spacers which are laminated alternately, and the magnetic poles are magnetized by a current supplied to the windings to have N and S poles alternately. The armature is a ring mounted on a rod-like non-magnetic support tube and is driven in the shaft direction by a magnetic flux produced by the current selectively flowing through the windings and passing through the stator and the armature.

Further, U.S. Pat. No. 5,093,596 (entitled "Combined Linear-Rotary Direct Drive Step Motor") discloses a three-phase VR type cylindrical linear pulse motor. The linear pulse motor according to the U.S. Patent includes a variable reluctance type linear stepping motor portion and a hybrid permanent magnet type rotary stepping motor portion having a common output shaft and accommodated in one housing.

However, the former linear pulse motor of them includes a stator disposed in the shaft direction thereof for constituting the phases, and there is a problem that the motor is lengthened in the shaft direction when a multi-phase motor is configured.

On the other hand, the latter linear pulse motor includes a stator composed of stator iron plates and spacer iron plates laminated alternately, and there is a problem that two kinds of iron plates must be laminated alternately to manufacture a stator core and the tips of salient poles of the stator iron plates must be bent alternately, so that the stator core cannot be manufactured easily.

OBJECT AND SUMMARY OF THE INVENTION

The present invention has been made in view of the above problems and an object of the present invention is to solve the above problems and to provide a VR type (variable reluctance type) linear pulse motor including a stator core manufactured easily and having a plurality of stator teeth formed on an inner peripheral surface thereof in a shaft direction and windings for phases capable of being disposed in the inner peripheral direction of the stator core and which is not lengthened in the shaft direction even when a multi-phase linear pulse motor is configured.

In order to achieve the above object, in a linear pulse motor including a stator provided with a stator core having a plurality of salient poles disposed at an equal pitch angle radially inward and a plurality of stator teeth formed on inner peripheral surfaces of the salient poles in a shaft direction and a mover provided with a mover core disposed within the stator to be supported movably in the shaft direction and having a plurality of mover teeth disposed opposite to the stator teeth on an outer peripheral surface of the mover core at an equal pitch in the shaft direction, the present invention is configured as follows:

(1) The stator core is formed by laminating stator iron plates of the stator core with the stator iron plates being rotated sequentially by a predetermined angle and when k is an integer equal to or larger than 1 and m is the number of phases, the stator iron plate includes k·m salient poles, one salient pole having a smaller inner radius at the tip thereof and (m−1) salient poles having a larger inner radius at the tip thereof opposite to the mover as viewed from the mover being disposed side by side in order of the description to form one set of salient poles, the stator core being constituted to have k sets of salient poles, the predetermined angle for the lamination and rotation being (360/k·m) degrees.

(2) The stator core is formed by laminating stator iron plates of the stator core with the stator iron plates being rotated sequentially by a predetermined angle and when m is the number of phases, the stator iron plate includes 2m salient poles, the stator core being constituted by two salient poles having a smaller inner radius at the tip thereof and (2m−2) salient poles having a larger inner radius at the tip thereof opposite to the mover as viewed from the mover disposed side by side in order of the description, the predetermined angle for the lamination and rotation being (360/m) or (180/m) degrees.

(3) The stator core is formed by laminating stator iron plates of the stator core with the stator iron plates being rotated sequentially by a predetermined angle and when m is the number of phases, m is a value equal to or larger than 4, the stator iron plate including m salient poles, the stator core being constituted by two salient poles having a smaller inner radius at the tip thereof and (m−2) salient poles having a larger inner radius at the tip thereof opposite to the mover as viewed from the mover disposed side by side in order of the description, the predetermined angle for the lamination and rotation being (360/m) degrees.

In operation of the present invention, the linear pulse motor configured above can use the core manufacturing technique used in a rotary type stepping motor and that the stator iron plates of one kind are laminated while being rotated sequentially by a predetermined angle, the stator core having a plurality of stator teeth formed on the inner peripheral surface thereof in the shaft direction can be manufactured easily.

DETAILED DESCRIPTION OF PREFERRED EMBODIMENTS

Preferred embodiments of the present invention are now described in detail illustratively with reference to the accompanying drawings.

Figure 1:
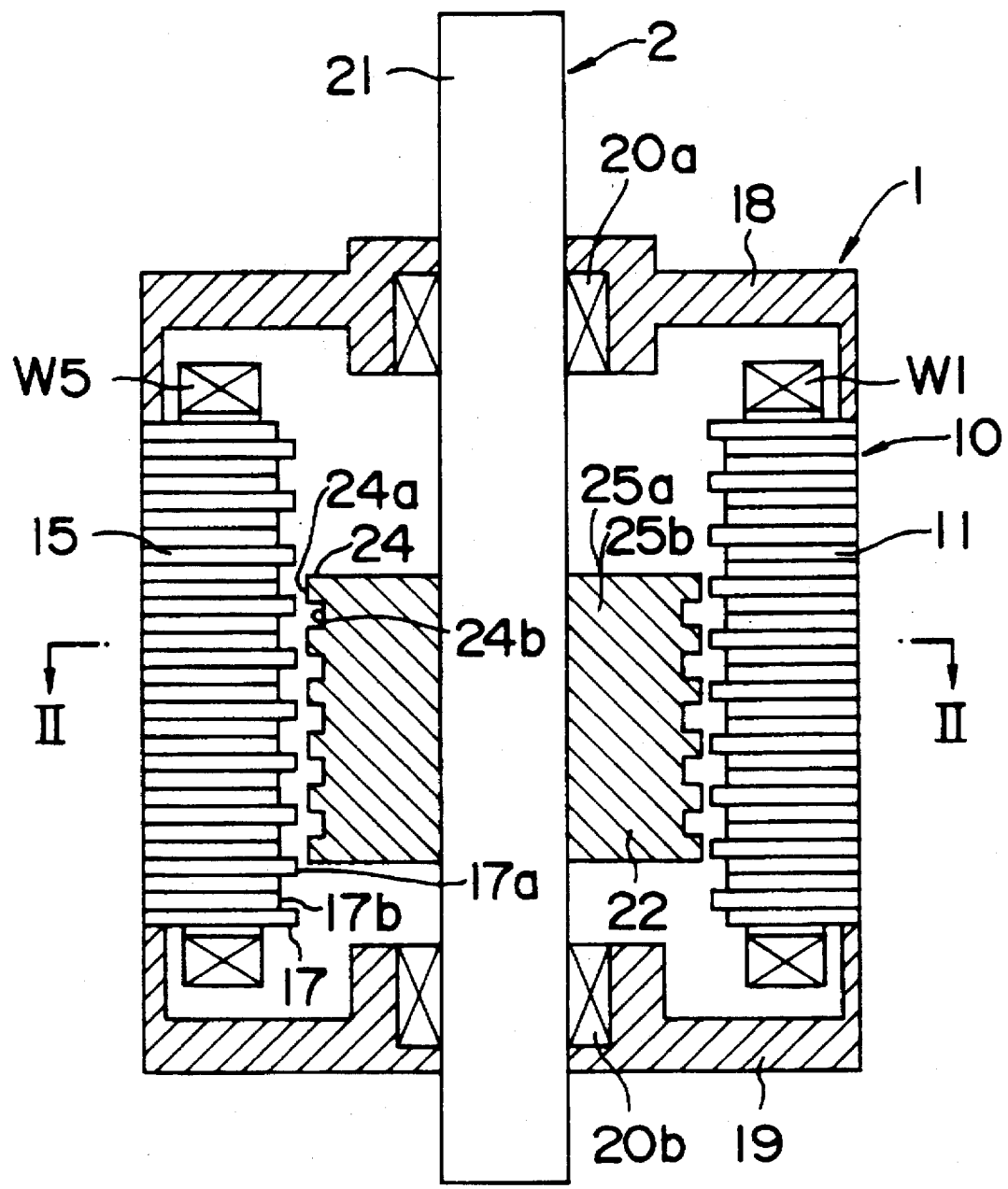
FIG. 1 is a longitudinal sectional view illustrating an embodiment of a linear pulse motor according to the present invention.
Figure 2:
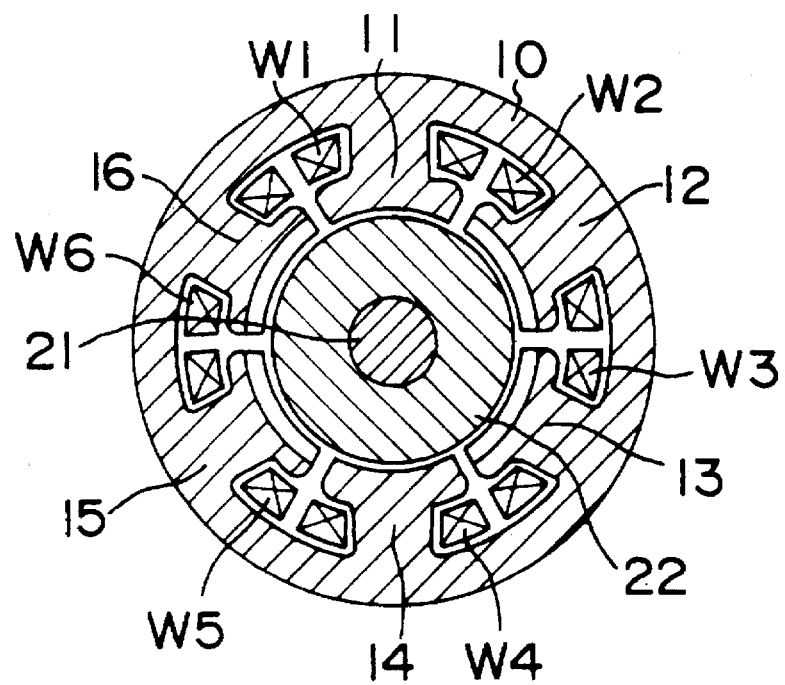
FIG. 2 is a transverse sectional view taken along line II—II of FIG. 1.

FIG. 1 is a longitudinal sectional view illustrating an embodiment of a linear pulse motor according to the present invention and FIG. 2 is a transverse sectional view taken along line II—II of FIG. 1.

The embodiment shows the case where an integer k and the number of phases m are k=2 and m=3, respectively, and accordingly the number of salient poles of a stator is k·m=6.

In FIGS. 1 and 2, a plurality of stator teeth 17 (tooth tops 17a and tooth bottoms 17b) are disposed in the shaft direction on the inner peripheral surfaces of six salient poles 11, 12, 13, . . . 16 disposed in a stator core 10 of a stator 1. Stator windings W1, W2, W3, . . . W6 are wound on the six salient poles 11, 12, 13, . . . 16, respectively. The stator core 10 is supported at both ends thereof through end brackets 18 and 19 by screws not shown.

On the other hand, a mover 2 disposed within the stator 1 is supported movably in the shaft direction through bearings 20a and 20b by the end brackets 18 and 19. A magnetic pole core 22 is disposed on a shaft 21 of the mover 2 and a plurality of mover teeth 24 (tooth tops 24a and tooth bottoms 24b) are disposed in the shaft direction on an outer peripheral surface of the magnetic pole core 22.

The magnetic pole core 22 includes mover iron plates 25 having a larger diameter for forming the tooth tops 24a and mover iron plates 25b having a smaller diameter for forming the tooth bottoms 24b, and one mover iron plate 25a and two mover iron plates 25b are laminated in order of the description alternately. It is a matter of course that the magnetic pole core 22 may be made by cutting magnetic material such as iron material instead of the laminated mover iron plates 25a and 25b.

Figure 3:
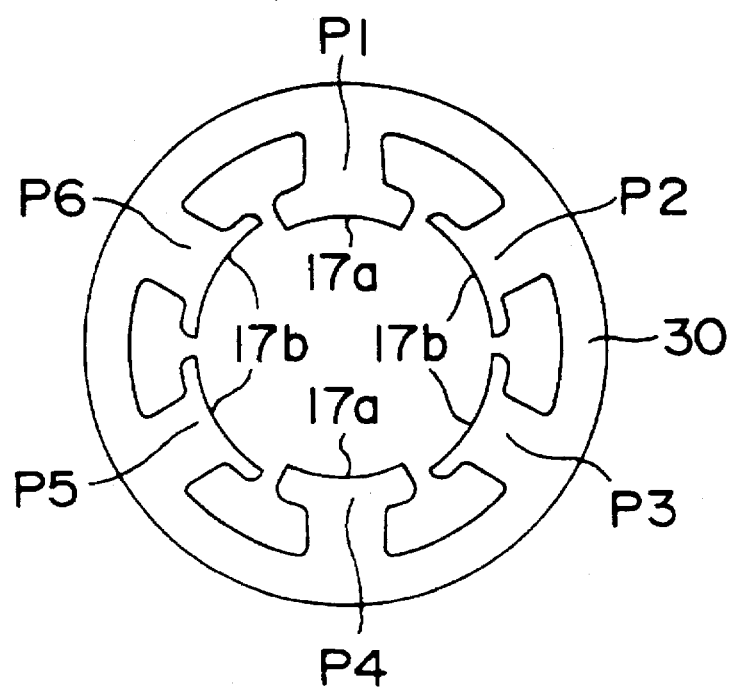
FIG. 3 is a plan view of a stator iron plate forming a stator core.

FIG. 3 shows an example of a stator iron plate 30 constituting the stator core 10. In FIG. 3, salient poles P1 and P4 of the stator iron plate 30 form salient poles (one for each) having a smaller inner radius at the tips thereof and constitute the tooth tops 17a of the stator teeth 17. Further, salient poles P2, P3, P5 and P6 form salient poles (m−1=3−1=2 for each) having a larger inner radius at the tips thereof and constitute the tooth bottoms 17b of the stator teeth 17. FIG. 3 shows the case of the integer k=2 and the number of phases m=3. That is, a set of salient poles P1, P2 and P3 and a set of salient poles P4, P5 and P6 are disposed sequentially in the circumferential direction of the stator core 10, so that two sets of salient poles exist in the circumferential direction of the stator core.

Figure 4:
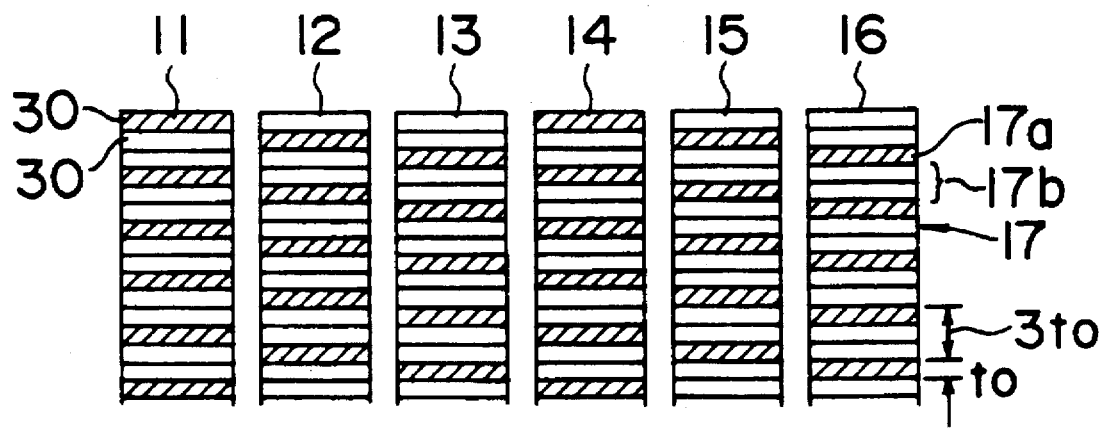
FIG. 4 is an expanded view of stator teeth formed by laminating the stator iron plates of FIG. 3 with the stator iron plates being rotated by a predetermined angle as viewed from a mover.

FIG. 4 shows the stator teeth 17 of the salient poles 11, 12, 13, . . . 16 formed by laminating the stator iron plates 30 with the iron plates 30 being rotated by an angle of 60 degrees (360/k·m=360/6) as viewed from the mover 2. Hatched portions represent the tooth tops 17a and blank or unhatched portions represent the tooth bottoms 17b. When a thickness of the stator iron plate 30 is $t_0$, the stator teeth 17 having a tooth pitch of m·$t_0$ or 3$t_0$ and the tooth thickness of $t_0$ are formed in the salient poles 11, 12, 13, . . . 16 by laminating and rotating the stator iron plates. Furthermore, the shift of the teeth 17 of the salient poles with respect to the salient pole 11 is ⅓ of the tooth pitch for the salient pole 12, ⅔ for the salient pole 13, ⅓, that is, 0 for the salient pole 14, ⅓ for the salient pole 15, and ⅔ for the salient pole 16.

Figure 5:
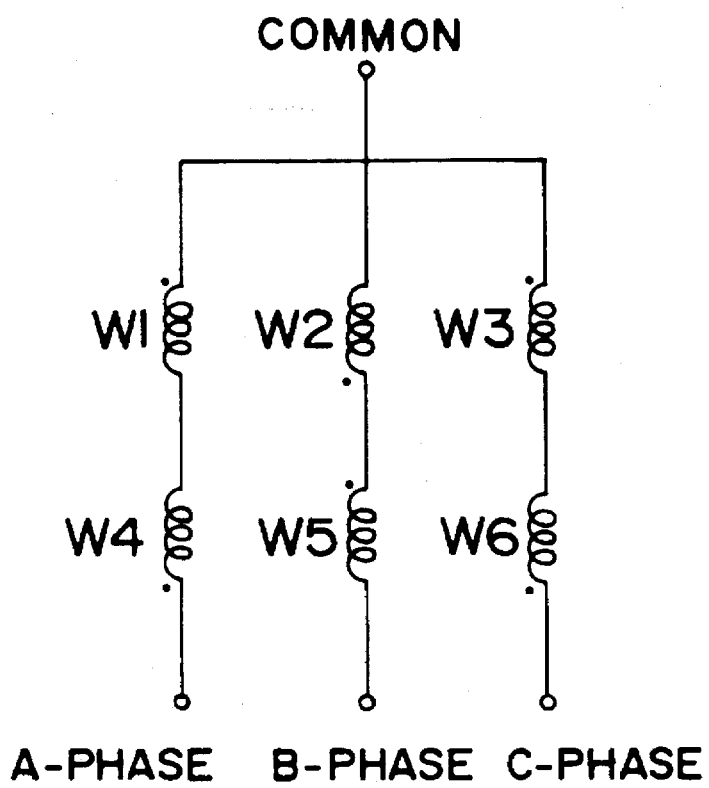
FIG. 5 is a connection diagram of stator windings.

Accordingly, as shown in FIG. 5, by connecting windings W1 and W4 to form a phase A, connecting windings W2 and W5 to form a phase B and connecting windings W3 and W6 to form a phase C, a three-phase VR type linear pulse motor can be configured. A basic amount of movement for each step at this time is 1/m of the tooth pitch or $t_0$. Dot marks given to the windings W1, W2, W3, . . . W6 of FIG. 5 represent the direction of the windings. For example, when a current flows from a common terminal to the phase A, the dot marks mean that the salient pole 11 is magnetized to N pole and the salient pole 14 is magnetized to S pole.

Figure 6:
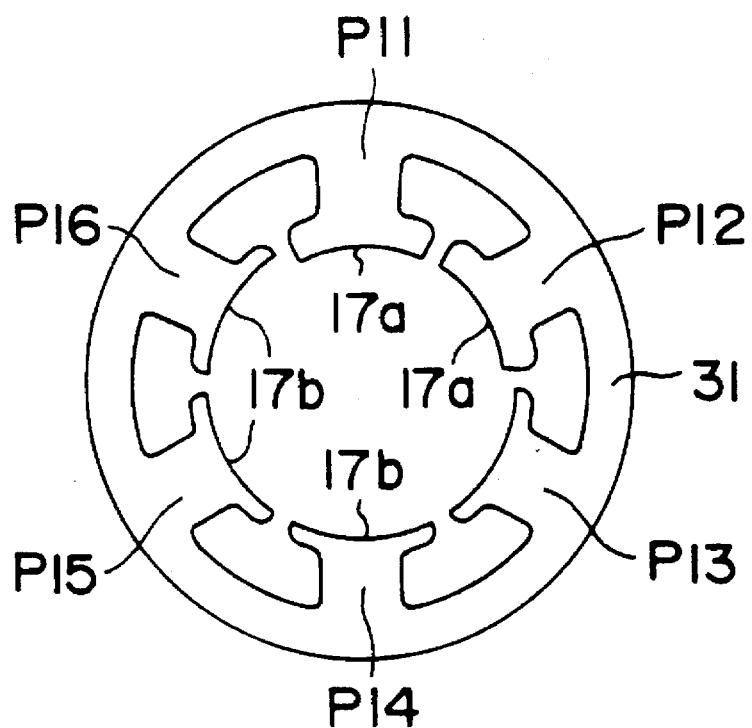
FIG. 6 is a plan view of another stator iron plate forming the stator core.

FIG. 6 shows a stator iron plate 31 as another example of the stator iron plate 30 constituting the stator core 10 and the number of phases m is m=3 in the same manner as FIG. 3.

In FIG. 6, the stator iron plate 31 includes 2m=6 salient poles P11, P12, P13, . . . P16. Two salient poles P11 and P12 form salient poles having a smaller inner radius at the tip thereof and constitute the tooth tops 17a of the stator teeth 17. Further, four salient poles P13, P14, P15 and P16 form salient poles having a larger inner radius at the tip of thereof and constitute the tooth bottoms 17b of the stator teeth 17.

Figure 7:
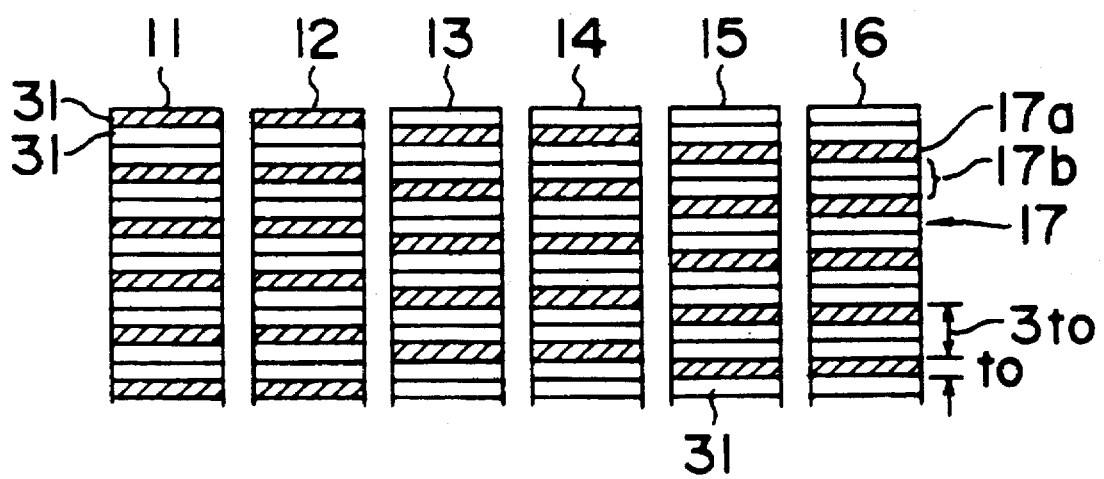
FIG. 7 is an expanded view of stator teeth formed by laminating the stator iron plates of FIG. 6 with the stator iron plates being rotated by 120 degrees as viewed from the mover.

FIG. 7 shows the stator teeth 17 of the salient poles 11, 12, 13, . . . 16 formed by laminating the stator iron plates 31 with the iron plates 31 being rotated by an angle of 120 (360/m=360/3) degrees as viewed from the mover. Similarly to the case of FIG. 4, hatched portions represent the tooth tops 17a and blank or unhatched portions represent the tooth bottoms 17b. When a thickness of the stator iron plate 31 is $t_0$, the stator teeth 17 having a tooth pitch of m$t_0$ or 3$t_0$ and a tooth thickness of $t_0$ are formed in the salient poles 11, 12, 13, . . . 16 by laminating and rotating the stator iron plates. Furthermore, the shift of the teeth of the salient poles with respect to the salient pole 11 is 0 for the salient pole 12, ⅓ of the tooth pitch for the salient poles 13 and 14 and ⅔ for the salient poles 15 and 16.

Figure 8:
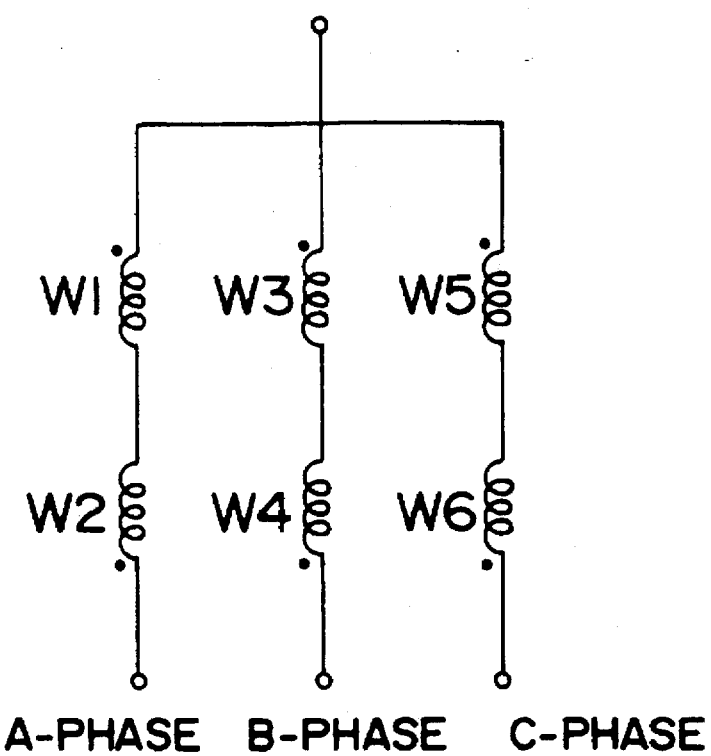
FIG. 8 is a connection diagram of stator windings of a three-phase linear pulse motor in FIG. 7.

Accordingly, as shown in FIG. 8, by connecting pairs of windings W1, W2; W3, W4; and W5, W6 adjacent to each other to have different polarities from each other so that Phases A, B and C are formed, a three-phase VR type linear pulse motor can be configured.

The case where the stator core 10 is formed by the stator iron plates 31 of FIG. 6 and the phase number m is m=6 is now shown. In this case, the number of salient poles is m, that is, 6.

Figure 9:
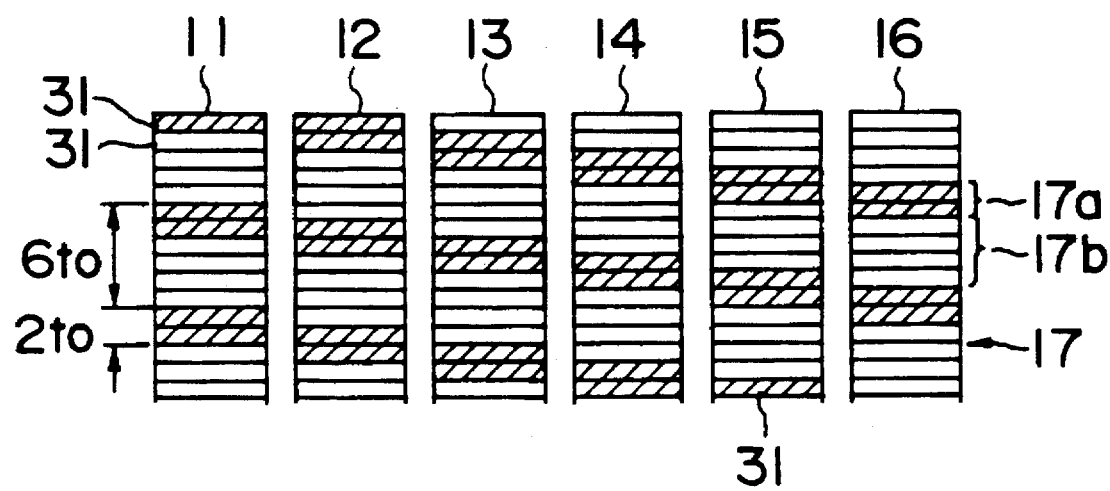
FIG. 9 is an expanded view of stator teeth formed by laminating the stator iron plates of FIG. 6 with the stator iron plates being rotated by 60 degrees as viewed from the mover.

FIG. 9 shows the stator teeth 17 of the salient poles 11, 12, 13, . . . 16 formed by laminating the stator iron plates 31 with the iron plates 31 being rotated by an angle of 60 (360/m=360/6) degrees as viewed from the mover. Similarly to the case of FIG. 4, hatched portions represent the tooth tops 17 and blank or unhatched portions represent the tooth bottoms 17b. When a thickness of the stator iron plate 31 is $t_0$, the stator teeth 17 having the tooth pitch of m$t_0$ or 6$t_0$ and the tooth thickness of 2$t_0$ are formed in the salient poles 11, 12, 13, . . . 16 by laminating and rotating the stator iron plates 31. Furthermore, the shift of the teeth of the salient poles with respect to the salient pole 11 is ⅙ of the tooth pitch for the salient pole 12, ⅖ for the salient pole 13, ⅜ for the salient pole 14, ⅘ for the salient pole 15 and ⅚ for the salient pole 16.

Figure 10:
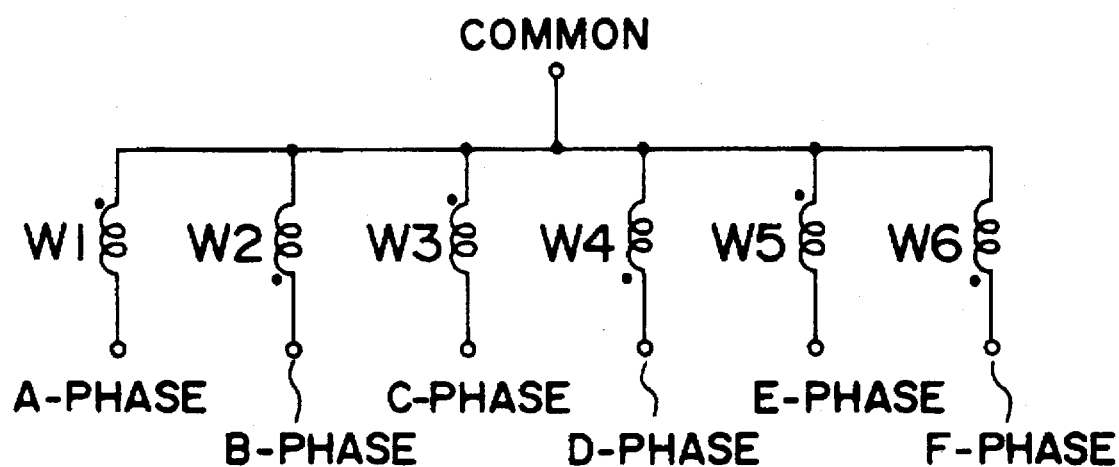
FIG. 10 is a connection diagram of stator windings of a six-phase linear pulse motor in FIG. 9.

Accordingly, as shown in FIG. 10, by connecting the windings W1, W2, W3, . . . W6, a six-phase VR type linear pulse motor can be configured.

Figure 11:
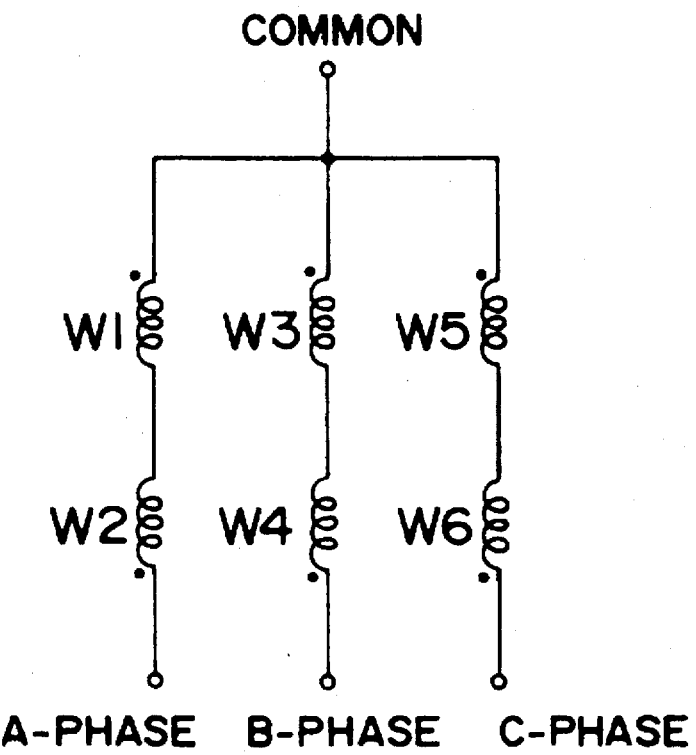
FIG. 11 is a connection diagram of stator windings of a three-phase linear pulse motor in FIG. 9.

Further, by connecting the windings W1, W2, W3, . . . W6 as shown in FIG. 11, a three-phase VR type linear pulse motor can be configured. In this case, the phase number m is m=3 and the stator iron plates 31 are laminated while rotated by an angle of 60 (180/m=180/3) degrees to have the same angle as the case of the six-phase VR type linear pulse motor.

The technique of the present invention is not limited to the technique of the embodiments and may be another means for attaining the similar function. Further, the technique of the present invention can be modified and added variously within the scope of the above configuration.

As apparent from the above description, according to the present invention, the stator core can be formed by forming a plurality of stator teeth in the inner peripheral surface thereof in the shaft direction and laminating the stator iron plates of the stator core while rotated sequentially by a predetermined angle. Accordingly, since the manufacturing technique of a core used in the rotary type stepping motor can be used, the stator core can be manufactured easily and inexpensively. Further, since the windings are disposed in the circumferential direction of the stator core, there can be provided the VR type linear pulse motor which is not lengthened in the shaft direction even when a multi-phase linear pulse motor is configured.

We claim:

1. A linear pulse motor including a stator provided with a stator core having a plurality of salient poles disposed at an equal pitch angle radially inward and a plurality of stator teeth formed on inner peripheral surfaces of said salient poles in a shaft direction and a mover provided with a mover core disposed within said stator to be supported movably in the shaft direction and having a plurality of mover teeth disposed opposite to said stator teeth on an outer peripheral surface of said mover core at an equal pitch in the shaft direction, characterized in that said stator core is formed by laminating stator iron plates of said stator core with said stator iron plates being rotated sequentially by a predetermined angle and when k is an integer equal to or larger than 1 and m is the number of phases, said stator iron plate includes k·m salient poles arranged such that each set of m salient poles associated with different phases includes one salient pole having a smaller inner radius at the tip thereof and (m−1) salient poles having a larger inner radius at the tip thereof opposite to said mover as viewed from said mover being disposed side by side in order of the description, said stator core being constituted to have k sets of salient poles, said predetermined angle for said lamination and rotation being (360L /k·m) degrees.

* * * * *